United States Patent [19]
Ulsh et al.

[11] Patent Number: 6,096,247
[45] Date of Patent: Aug. 1, 2000

[54] EMBOSSED OPTICAL POLYMER FILMS

[75] Inventors: Michael J. Ulsh, Woodbury; Mark A. Strobel, Maplewood; David F. Serino, St. Paul; Janet T. Keller, Eagan, all of Minn.

[73] Assignee: 3M Innovative Properties Company, St. Paul, Minn.

[21] Appl. No.: 09/127,065

[22] Filed: Jul. 31, 1998

[51] Int. Cl.[7] .............................. B29D 11/00; B29C 59/04
[52] U.S. Cl. ........................... 264/2.7; 264/1.6; 264/1.7; 264/284; 264/293; 425/385
[58] Field of Search ................... 264/1.6, 1.7, 2.7, 264/284, 448, 446, 492, 493, 293; 425/385

[56] References Cited

U.S. PATENT DOCUMENTS

| | | | |
|---|---|---|---|
| 2,928,124 | 3/1960 | Hugger | 264/284 |
| 3,950,480 | 4/1976 | Adams et al. | 264/284 |
| 4,211,743 | 7/1980 | Nauta et al. | 264/284 |
| 4,248,822 | 2/1981 | Schmidt | 264/154 |
| 4,601,861 | 7/1986 | Pricone et al. | 264/1.6 |
| 5,614,286 | 3/1997 | Bacon, Jr. et al. | 428/161 |
| 5,693,285 | 12/1997 | Ishii et al. | 264/492 |
| 5,753,754 | 5/1998 | Strobel et al. | 525/61 |
| 5,763,049 | 6/1998 | Frey et al. | 428/172 |
| 5,770,124 | 6/1998 | Marecki et al. | 264/1.36 |

FOREIGN PATENT DOCUMENTS

| | | |
|---|---|---|
| 0 796 716 A1 | 9/1997 | European Pat. Off. . |
| 52-32980 | 3/1977 | Japan . |
| 56-86721 | 7/1981 | Japan ..................... 264/492 |
| 63-205214 | 8/1988 | Japan ..................... 264/448 |
| WO 97/01440 | 1/1997 | WIPO . |
| WO 98/11154 | 3/1998 | WIPO . |
| WO 99/16608 | 4/1999 | WIPO . |

OTHER PUBLICATIONS

U.S. Patent application Ser. No. 08/942,062, filed Oct. 1, 1997.

*Primary Examiner*—Mathieu D. Vargot
*Attorney, Agent, or Firm*—Douglas B. Little

[57] ABSTRACT

A method of making embossed optical polymer films and embossed optical polymer films made are described. The embossed optical polymer films have substantially the same optical properties as unembossed optical polymer films. The method includes providing an optical polymer film having first and second major surfaces, softening at least one of the first and second major surfaces to produce a softened surface, embossing the softened surface to produce an embossed optical polymer film, and cooling the embossed optical polymer film.

14 Claims, 8 Drawing Sheets

EMBOSSED OPTICAL POLYMER FILMS

FIELD OF THE INVENTION

This invention relates to optical polymer films. In particular, this invention relates to the process of forming embossed optical polymer films and to films made by this forming process.

BACKGROUND OF THE INVENTION

Optical films generally obtain optical properties through a combination of choosing materials having differing refractive indices and forming the materials in a spatial relationship that results in the desired optical effect when the films interact with light.

Optical polymer films are films that exhibit certain desirable optical effects. Specifically, these films include polymer films that are designed to reflect, transmit, absorb or refract light upon exposure to a specific band of electromagnetic energy. These optical polymer films can be made with a variety of properties. One class of optical films will lose significant optical performance if exposed to an excessive amount of heat. This class achieves much of its optical properties through a multilayer or blend construction of at least two different polymers having different indices of refraction. This difference in refractive indices may be enhanced through an orientation or stretching process if at least one of the polymeric materials is capable of stress-induced birefringence. Such a process thins related polymer regions to a thickness that allows for interaction with desired ranges of wavelengths in specified ways. The regions may be in the form of thin layers of different films or thin discontinuous polymer regions within a second polymer matrix. Exposure to excessive heat may cause mixing of the discreet polymer layers, and in the case of oriented multilayer or blend films tends to relax the ordered nature caused by the orientation, thus degrading the film's optical performance.

This class of oriented films includes multilayered films and films composed of blends of two or more polymeric materials. Multilayer films provide reflective and transmissive properties through a multiplicity of layers that each have a thickness on the order of a fraction of the distance corresponding to a wavelength of light, and are useful in reflective applications. Examples of this type of film include polarizers, visible and infrared mirrors, and color films such as those described in Patent Publications WO 95/17303, WO 96/19347 and WO 97/01440, and in U.S. Pat. No. 5,103,337 (Schrenk), U.S. Pat. No. 5,122,905 (Wheatley et al), U.S. Pat. No. 5,122,906 (Wheatley), U.S. Pat. No. 5,126,880 (Wheatley), U.S. Pat. No. 5,217,794 (Schrenk), U.S. Pat. No. 5,233,465 (Schrenk), U.S. Pat. No. 5,262,894 (Wheatley), U.S. Pat. No. 5,278,694 (Wheatley) U.S. Pat. No. 5,339,198 (Wheatley), U.S. Pat. No. 5,360,659 (Arends), U.S. Pat. No. 5,448,404 (Schrenk), U.S. Pat. No. 5,486,949 (Schrenk) U.S. Pat. No. 4,162,343 (Wilcox), U.S. Pat. No. 5,089,318 (Shetty), U.S. Pat. No. 5,154,765 (Armanini). U.S. Pat. No. 3,711,176 (Alfrey, Jr. et al.); and Reissued U.S. Pat. No. RE 31,780 (Cooper) and U.S. Pat. No. RE 34,605 (Schrenk). Blend constructions obtain reflective and transmissive properties from the presence of discontinuous polymeric regions having a cross-sectional diameter perpendicular to the major axis that is on the order of a fraction of the distance corresponding to a wavelength of light. Such films may also obtain the desired optical properties through orientation. Examples of such films include blend mirrors and polarizers as described in Patent Publications WO 97/32224, filed application having U.S. Ser. No. 09/006455, and U.S. Pat. No. 5,751,388 (Larson).

A second class of optical films is relatively impervious to the effects of excessive heat. This class achieves much of its optical property from rigid replicated prismatic shapes on a surface of a flexible polymer layer. These ordered shapes provide most of the reflective optical properties of the film and are usually cured such that they are more heat resistant than the supporting polymer layer. The optical characteristics of the cured shapes do not change easily with heat. These films may be used in a transmissive, reflective, or refractive mode depending on the application. This class of films includes, for example, ordered reflective cube-corner sheeting such as those described in U.S. Pat. No. 5,450,235 (Smith et al), U.S. Pat. No. 5,691,846 (Benson et al), U.S. Pat. No. 5,614,286 (Bacon, et al) and U.S. Pat. No. 5,763,049 (Frey et al).

Embossment of the surface of an optical film can be used to manipulate its optical or mechanical properties. Physical embossing, i.e., achieving a contoured surface by pressing the surface of an optical film against a tooled surface, generally results in shallow contours because of the hardness of typical polymeric materials that are used. Thermal embossing, i.e., passing the optical film surface in pressed contact with a heated tooled surface, results in patterns having deeper contour or depth. However, the heat transfer between a heated surface and the contacting film is so efficient that the film typically is heated to near its melting point for most of the contact time, often destroying spatial relationships within the film and adversely affecting its optical properties. The controlled thickness of oriented film layers can become disordered and the ordered alignment of fibrous discontinuous regions can become unaligned. While degradation of the optical properties of cured reflective films generally is of less concern, these films too cannot be embossed easily with hot tooled surfaces. Because cured reflective films have large heat sink capacities, production speeds used to manufacture such films are limited.

Thus, there is a need to thermally emboss optical polymer films without degrading optical properties and to do so at faster speeds.

SUMMARY OF THE INVENTION

Briefly, in one aspect of the present invention, a method of making an embossed optical polymer film is provided that comprises the steps of providing an optical polymer film having first and second major surfaces and then, in separate steps, softening at least one of the first and second major surfaces to produce a softened surface, embossing the softened surface to produce an embossed optical polymer film, and cooling the embossed optical polymer film. In a preferred embodiment the combined steps of softening, embossing, and cooling occur in less than 1 second for optical films that optically degrade with excessive heat.

In a preferred embodiment, a heat flux is provided by either a flame burner or a flameless radiant burner to at least one major surface of an optical polymer film resulting in a softened surface. The film then is passed between a nip having at least one embossing surface to form embossments on the softened surface of the film. This embossed surface is then cooled to fix the structure of the embossments. The time required to heat, emboss, and cool the embossed optical polymer film ranges from about 0.05 to about 1 second for optical films that optically degrade with excessive heat.

In another aspect, the invention provides an optical polymer film made by the above described process. Such a film can have embossments with contours that range from shallow to deep. Multilayered color shifting films with deep embossments have a satin-like appearance. Embossed reflective polarizing films that specularly transmit one plane of polarization and specularly reflect the other plane have reduced surface friction characteristics that permit improved handling without causing unwanted surface damage. Reflective polarizing films that specularly transmit one plane of polarization and diffusely reflect the other plane can be made with diffusely transmissive characteristics. Reflective cube-corner films that glitter or sparkle can be made at faster production speeds.

In yet another aspect, this invention provides a layered construction made by the above described process. The layered construction comprises an optical-property-containing film, itself possibly having multiple layers and having a first and a second major surface, and at least one protective layer affixed to at least one of the major surfaces where the protective layer contains the surface embossments. Such protective layers do not have to have sufficient thickness to protect the optical properties of the optical film layer during the embossing method of the invention. Thus, the protective layer can comprise a thin layer of expensive materials to provide specific additional features such as corrosion protection. Alternatively, films having protective layers thick enough to protect the underlying optical-property generating layer may be embossed at greater speeds than otherwise possible.

In still another aspect, the invention provides a method of making an optical polymer article by providing a layered construction comprising an optical polymer film having a major surface, softening the major surface to produce a softened surface, embossing the softened surface to produce an embossed layered construction, and cooling the embossed layered construction, wherein the bulk optical properties are substantially unchanged from those of the optical polymer film in the layered construction before embossing.

The embossed optical polymer films of the invention have substantially identical optical properties in the form of amount and wavelengths of light that is reflected vs. transmitted as the optical polymer films exhibit before embossing. The methods of the invention, however, impart variable topography to an optical polymer film that leads to variation in such characteristics as diffuse reflection, diffuse transmission, selective angular scattering (sparkling) and surface friction. Further, when the softening step is carried out by flame treatment, this method imparts additional surface characteristics such as improved wetting and chemical adhesion to subsequent coatings.

Color shift films embossed by the process of the invention, when compared with films processed by other methods, have denser patterns with the same reflectivity and can be processed at faster speeds. Reflective cube-corner films that are embossed to create a decorative glitter appearance may be embossed at speeds of up to 45 meters per minute while those embossed by a hot-can technique typically are made at less than 3 meters per minute.

DETAILED DESCRIPTION OF THE PREFERRED EMBODIMENTS

The present invention provides a method of making an embossed optical polymer film and films and articles made by such a method. A wide range of optical polymer films are suitable in the practice of this invention. "Film" is used to refer to planar forms of plastic that are thick enough to be self-supporting but thin enough to be flexed, folded, conformed or creased without cracking. Film thickness depends upon desired applications and manufacturing methods. "Polymer" refers to organic polymeric materials. Natural substances that exhibit this behavior include crude rubber and a number of waxes. The term, however, generally is used to apply to synthetic polymers.

"Optical Film" will be used herein to refer to any reflective or partially reflective polymer film designed to exhibit desired reflection, transmission, absorption, or refraction of light upon exposure to a specific band of wavelengths of electromagnetic energy. Thus conventional normally transparent polymeric films, such as polyester and polypropylene, are not considered "optical films" for the purposes of this invention, even though such films may exhibit some degree of reflectance, or glare, when viewed from some angles. Films that exhibit both reflective and transmissive properties, however, such as those that are partially transmissive, are considered within the scope of the invention. Preferred optical polymer films for use in the invention generally absorb less than 25 percent of the radiant energy that impacts the film's surface. If the optical polymer films are colored by means of the introduction of colorants into the film, however, greater amounts of radiant energy may be absorbed by the colorant materials. Preferably the radiating energy absorbed is less than 10 percent and most preferably less than 5 percent. The radiant energy, typically expressed as the energy in a range of wavelengths, may be reflected either specularly or diffusely. The reflectance may be isotropic, i.e., the film has the same reflective properties along both in-plane axes, or may be anisotropic, i.e., the film has different reflective properties along the orthogonal in-plane axes. The difference in reflective properties along the in-plane axes can be varied by controlling the relationship between the indices of refraction along each axis for each of the component materials.

It will be understood that the embossed optical films of the invention exhibit reflection, transmission, absorption, or refraction characteristics in the bulk phase that are substantially the same as those exhibited by the unembossed optical film prior to embossing. By this it is meant that the spatial characteristics of the discrete materials having different refractive indices have not sufficiently changed to adversely affect the amount or wavelength of light that is reflected, transmitted, absorbed, or refracted. Other optical properties such as the degree of diffuse reflection or transmission vs. specular reflection or transmission may be altered in the embossed film. This feature will, of course, depend on the nature of the optical film and on the desired application.

Optical films come in a variety of forms and are selected according to a desired application. A first class of optical films useful in the invention may be defined broadly as including those whose bulk optical properties are significantly impacted when exposed to excessive heat. Films of this first class include, for example, multilayer films and films comprised of a blend of immiscible materials having differing indices of refraction. Examples of this type of film include multilayer polarizers, visible and infrared mirrors, and color films such as those described in Patent Publications WO 95/17303, WO 96/19347, and WO 97/01440; filed applications having U.S. Ser. No. 09/006086 and U.S. Pat. No. 09/006591; U.S. Pat. Nos. 5,103,337 (Schrenk), U.S. Pat. No. 5,122,905 (Wheatley et al), U.S. Pat. No. 5,122,906 (Wheatley), U.S. Pat. No. 5,126,880 (Wheatley), U.S. Pat. No. 5,217,794 (Schrenk), U.S. Pat. No. 5,233,465 (Schrenk), U.S. Pat. No. 5,262,894 (Wheatley), U.S. Pat. No. 5,278,694 (Wheatley), U.S. Pat. No. 5,339,198 (Wheatley), U.S. Pat. No. 5,360,659 (Arends), U.S. Pat. No. 5,448,404 (Schrenk), U.S. Pat. No. 5,486,949 (Schrenk) U.S. Pat. No. 4,162,343 (Wilcox), U.S. Pat. No. 5,089,318 (Shetty), U.S. Pat. No. 5,154,765 (Armanini), and U.S. Pat. No. 3,711,176 (Alfrey, Jr. et al.); and Reissued U.S. Pat. No. RE 31,780 (Cooper) and U.S. Pat. No. RE 34,605 (Schrenk), all contents of which are incorporated herein by reference. Examples of optical films comprising immiscible blends of two or more polymeric materials include blend constructions wherein the reflective and transmissive properties are obtained from the presence of discontinuous polymeric regions having a cross-sectional diameter perpendicular to the major axis that is on the order of a fraction of the distance corresponding to a wavelength of light, and may also obtain the desired optical properties through orientation, such as the blend mirrors and polarizers as described in Patent Publications WO 97/32224, filed application having U.S. Ser. No. 09/006455, and U.S. Pat. No. 5,751,388 (Larson), the contents of which are all herein incorporated by reference. Also included are those microporous films including diffuse reflective films such as those described in "Diffuse Reflective Articles", Kaytor et al, filed as U.S. Ser. No. 08/957,558, the content of which is herein incorporated by reference.

The color shift films and reflective polarizing films described above may achieve desired optical properties through orientation of thin polymer components. Excessive heat causes the strains produced by orientation (which induces birefringence) to relax and create disordered aspects that adversely affect the bulk optical properties. Optical films made of immiscible polymer blends achieve much of their optical property through numerous randomly ordered air/polymer interfaces that are created by stretching and/or washing operations. Excessive heat with pressure squeezes the air out and reduces the number of air/polymer interfaces seen by a ray of radiation.

A second class of optical polymer films useful in the present invention do not easily lose their optical properties through excessive heating. Films of this class include reflective films such as the reflective cube-corner sheeting described in U.S. Pat. No. 5,450,235 (Smith et al), U.S. Pat. No. 5,691,846 (Benson et al), U.S. Pat. No. 5,614,286 (Bacon, et al) and U.S. Pat. No. 5,763,049 (Frey et al), all of whose descriptions are incorporated herein by reference. Examples of these films are available commercially, for example from 3M Company as 3M Scotchlite™ Reflective Material—Series 6200 High Gloss Film and as Scotchlite™ Diamond Grade Ultraflexible Conspicuity Sheeting Series 960. These optical films achieve optical properties through the presence of cured cube-corner structures on one side of a polymer film construction.

In one embodiment of the invention, a layered construction is used as the input film. Such films include, for example, at least one layer of at least one polymer that is formed on at least one surface of at least one optical polymer film. The additional layer may be coextruded with the optical layer, or either extrusion coated, laminated or otherwise adhered to the optical polymer layer. The additional layer or layers are generally used to protect the optical polymer layer from degradation due to such as corrosion, weathering, and scratches and should be as thin as possible to minimize adverse effects on the optical properties of the layered film. The layers may be of any polymer that provides the desired effect.

In one embodiment of the method of this invention, an optical polymer film or a layered optical polymer film having a first and second major surface is provided. The optical film can move between or over rollers or the like that serve to control the film tension. At least one of the first and second major surfaces of the film is exposed to a heat flux from a heat source such as a flame, a plasma torch, and the like. The heat source softens the surface of the input film in the desired time frame, that is, rapidly enough to cause softening of the film surface without causing a significant change in the optical properties of the bulk film. Preferred heat sources include flame burners and flameless radiant burners.

The film may move over a support, such as a backing roll, while being exposed to the source of heat. A support for the film can minimize distortion of the film during heating. The heat source provides sufficient heat to the surface of the optical film to soften the surface as necessary for embossing. Embossing can be carried out by any means known in the art. The preferred method of embossing is to move the softened film through a nip having an embossing surface. "Nip" refers to two rolls in proximity that apply pressure on a film when the film passes between them. The embossing surface contacts the film with sufficient force to create embossments in the softened surface of the film. Greater pressure generally causes deeper, more contoured embossments. The embossed film is then cooled by any of a number of methods to reduce the temperature of the softened surface to below its softening temperature before the softened film has experienced a significant change in bulk optical properties of the unembossed optical film. Such methods include moving the film over one or more chilled rollers, delivering it to a water bath, or cooling by air or other gases, such as by use of an air knife.

In this application, "dwell time" is defined as the time it takes for the combined steps of softening, embossing, and cooling the film. Dwell time will vary depending upon the configuration (e.g., equipment size and film speed) of the system used to heat, emboss, and cool the film. The time of exposure to heat should be sufficient to soften the surface of the optical film prior to contact with the embossing roll and the dwell time should not be so long as to cause destruction of the optical properties of the film. Thus, in preferred embodiments, the dwell time is as short as possible.

Figure 1:
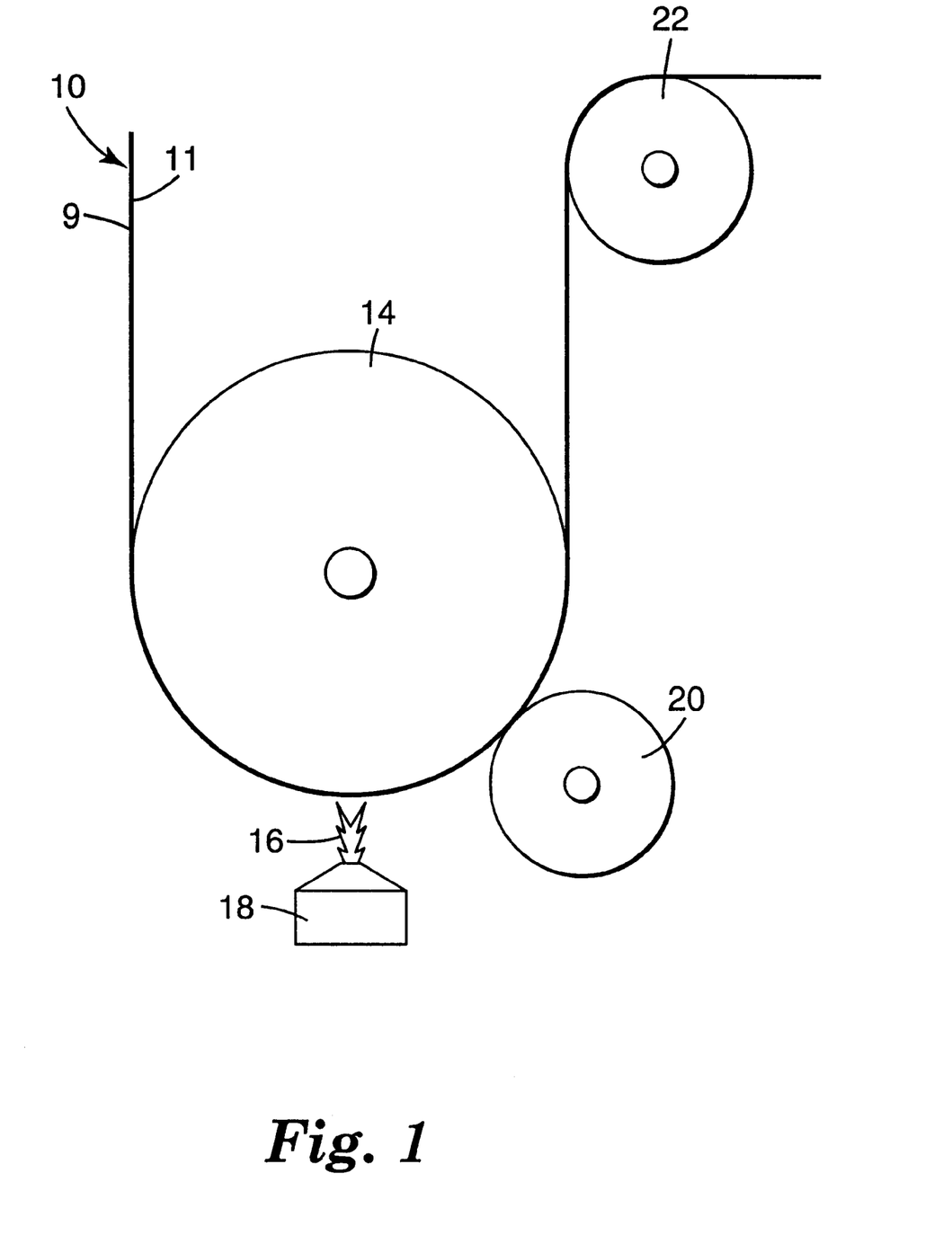
FIG. 1 is a schematic representation of one embodiment of the method of this invention.

An embodiment of the method of this invention is illustrated in FIG. 1. Optical polymer film 10 having major surfaces 9 and 11 is passed to backing roll 14. Major surface 9 of film 10 moves over flame 16 provided by ribbon burner 18. Alternatively, other sources of heat such as a flameless radiant burner could be used. Rapid heating of major surface 9 occurs. Film 10 is transported between backing roll 14 and male-patterned metal-plated embossing roll 20 to form an embossed surface of film 10 having a reverse pattern of that machined into embossing roll 20. Backing roll 14 may be covered with a smooth layer to insure intimate contact between rolls 14 and 20 and film 10. Suitable covering layers for the backing roll include elastomers such as neoprene, nitrile rubber, silicone rubber, polyether urethane rubber, chlorosulfonated rubber, polytetrafluoroethylene (PTFE), and the like. The temperature of either or both rolls can be controlled by means of a water recirculation system.

Embossing roll 20 is forced against backing roll 14 by means of pneumatic or hydraulic cylinders and lever mechanisms as are known in the art. The force applied to embossing roll 20 is controlled by varying pressure to the cylinders and by varying the width of contact between embossing roll 20 and backing roll 14. Typically the force applied to embossing roll 20 varies from about 17.5 to about 1050 N/lineal cm (10 to about 600 pounds/lineal inch). The applied force should be sufficient to emboss a desired pattern into the optical film.

Film 10 is then cooled by moving over water cooled chill roll 22. Those skilled in the art recognize that other cooling means can be used. For example, an air knife, evaporating liquid nitrogen, or a water bath could be used to cool the surface of the embossed optical polymer film as it leaves the embossing roll.

The time for a point on surface 9 to be softened as it moves over flame 16, through backing roll 14 and embossing roll 20 and to be cooled below its softening point as it moves over chill roll 22 is the "dwell time." The dwell time typically ranges from about 0.05 seconds to about 1 second and preferably ranges from about 0.1 to about 0.3 seconds. The time of exposure to the heat from the flame should be sufficient to soften the surface of the optical polymer film prior to contact with the embossing roll and the dwell time should not be so long as to cause destruction of the optical properties of the film.

Flame burner 18 ordinarily stabilizes a premixed flame in which the fuel and oxidizer are thoroughly mixed prior to combustion and the rate of combustion is controlled by the rate of chemical reactions that occurs in the flame. In a premixed flame, the luminous region is that portion of the flame where the temperature rise is the greatest and where much of the reaction and heat release occur. To rapidly heat a polymer film to elevated temperatures, both premixed and diffusion flames can be used. In a diffusion flame, separate fuel and oxidizer streams come together through molecular and turbulent diffusion. In diffusion flames, the rate of combustion is controlled by the rate of mixing of the reactants. Unlike premixed flames, which typically have a narrow, 1–2 mm wide reaction zone, diffusion flames have a wider region through which the chemical composition changes and chemical reaction takes place. Both premixed and diffusion flames can be either laminar or turbulent in nature.

Flames commonly are described in terms of two characteristics: flame power and molar ratio of oxidizer to fuel. Flame power is the product of the volume of fuel burned per unit time and the heat content of the fuel. Typical units for flame power are W or Btu/hr. In flame treating, flame power can be normalized to account for the dimensions of the burner, leading to units such as $W/cm^2$ or $Btu/hr-in^2$. The exact ratio of oxidizer to fuel needed for complete combustion is expressed as a stoichiometric ratio. For example, the exact amount of dry air necessary for the complete combustion of methane is 9.55 volumes per volume of methane. Thus, the stoichiometric ratio for an air:methane flame is 9.55:1. The equivalence ratio is defined as the stoichiometric oxidizer:fuel ratio divided by the actual oxidizer:fuel ratio. For fuel-lean flames, there is more than the stoichiometric amount of oxidizer and so the equivalence ratio is less than 1.00. For oxidizer:fuel mixtures at the stoichiometric ratio, the equivalence ratio is exactly 1.00. For fuel-rich systems, the equivalence ratio is greater than 1.00.

Flame treating equipment useful for this invention include any that can provide a flame in close proximity to the polymer surface. Generally, the film surface is flame treated as the film moves over a cooled support, e.g., a cooled roll, to prevent film distortion. Flame treating equipment includes commercial systems manufactured by, for example, The Aerogen Company, Ltd., Alton, United Kingdom, and Sherman Treaters Ltd., Thame, United Kingdom. Preferably the equipment has a mixer to combine an oxidizer with fuel. A ribbon burner is best suited for the flame treatment of polymer films, but other types of burners may also be used.

The flame has an optimal distance from the polymeric substrate surface and is supported by a mixture of oxidizer and fuel. The distance between the tip of the luminous cone of the flame and the surface of the polymer ranges between about 30 mm to about –2 mm, i.e., the film is contacted by the flame and occupies space that would otherwise comprise the terminal 2 mm of the flame tip. Preferably the distance is between 0 mm and 10 mm. The fuel has a lower electronegativity than the oxidizer. Suitable fuels include, for example, natural gas, methane, ethane, propane, butane, ethylene, liquefied petroleum gas, acetylene, carbon monoxide, dimethyl ether, ammonia, and blends thereof. Suitable oxidizers include air, oxygen-enriched air, and nitrous oxide-enriched air. The oxidizer reacts with the fuel to form chemical species that may react with the surface of the thermoplastic film.

An alternate preferred method of heating the surface of the optical film is with a flameless radiant burner. In this case, the premixed oxidizer/fuel stream is exposed to a solid, perforated catalytic element mounted on a steel housing. The catalytic surface supports the conversion of the reactant stream to products in a heterogeneous surface reaction. Because the combustion reaction occurs on the surface of the catalyst, few excited species are created in the gas phase. Thus, little if any surface treatment of polymer film occurs during the heating step. Hot combustion products then desorb and/or diffuse from the surface and exit the burner. The heat released in the heterogeneous reaction raises the temperature of the catalyst such that it glows and emits infrared radiation. Heat therefore is provided to the film by both convection and radiation modes with this type of burner. For a given flame power, as defined above, the heat flux to the film from this type of burner is approximately equivalent to that of a ribbon flame burner. Radiating burners of this type are available, for example, from Flynn Burner Corporation, New Rochelle, N.Y.

Figure 2:
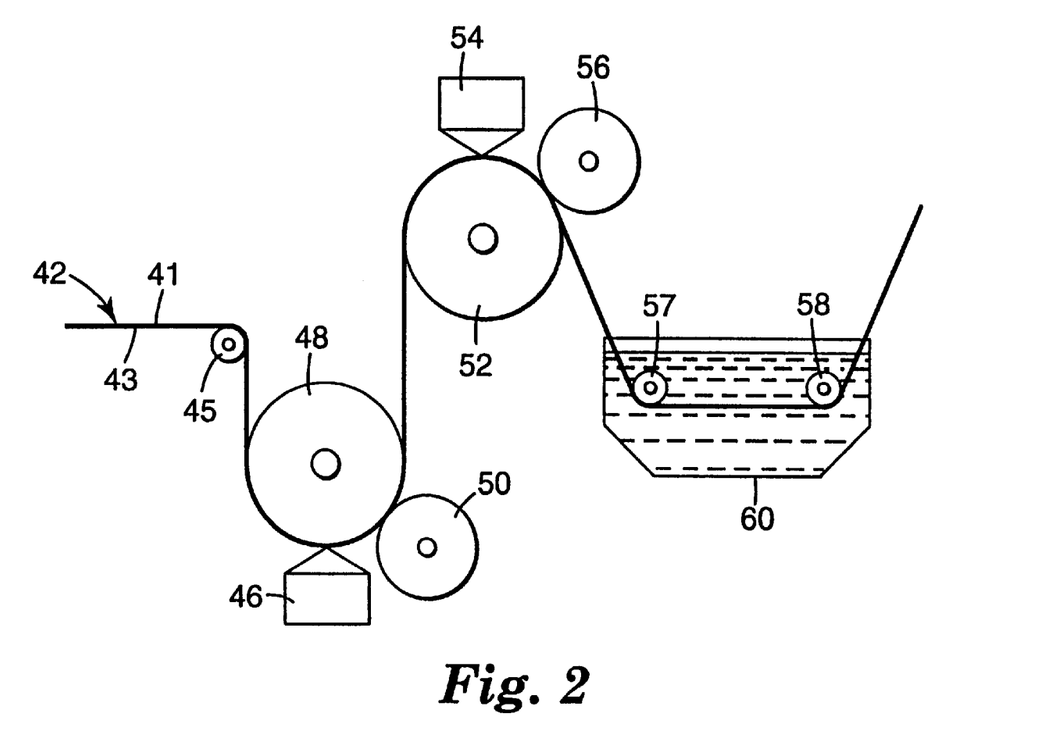
FIG. 2 is a schematic representation of another embodiment of the method of this invention.

Turning now to FIG. 2, another embodiment of the method of this invention is shown. In this embodiment, both major surfaces of the optical polymer film are softened and embossed. Optical polymer film 42 having major surfaces 41 and 43 moves over idler roll 45 which serves to control the tension of the film. Film 42 is transported to backing roll 48. Major surface 43 of film 42 moves over heat source 46.

Suitable heat sources include a plasma torch, a flame, provided, for example, by a ribbon burner, and a flameless radiant burner. Rapid heating of major surface 43 occurs. Film 42 is transported between backing roll 48 and male-patterned embossing roll 50 to produce embossments on major surface 43. Film 42 is transported to second backing roll 52 arranged so that major surface 41 moves proximate to second heat source 54. Heat source 54 may the same type as heat source 46, or may be a different type of heat source. Rapid heating of major surface 41 occurs. Film 42 is then transported between backing roll 52 and embossing roll 56 to produce embossments on major surface 41. Film 42 proceeds to idler rolls 57 and 58 that hold the film in tension while it goes through water bath 60. An air knife would also be suitable cooling means and could be substituted for the water bath.

Returning now to the method of this invention, embossing refers to a process in which a pattern is impressed into the surface of an article. Embossing typically is accomplished by means of a male pattern formed on a hard material such as a metal layer on an embossing roll, as depicted by 20 in FIG. 1. Those skilled in the art recognize that embossing can be done by several methods, including the use of a continuous tooled belt or sleeve. Preferred metal layers include those comprising nickel, copper, steel, and stainless steel. Patterns typically are machined into the metal layer and can have a wide variety of sizes and shapes. Any pattern that can be scribed into a metal surface can be used in the practice of this invention. "Pattern" does not necessarily refer to a regular repeating array, but may mean a random array of features having the same or different sizes. Patterns suitable for the practice of this invention include four-sided square pyramids, truncated four-sided square pyramids, three-sided triangular pyramids, cones, straight lines, wavy lines, and the like and are machined into at least a portion of the embossing roll. An individual feature of the pattern is referred to as an embossment. The number and spacing of embossments, as well as the nature of the individual embossment, such as its depth, degree of sharp reflecting edges, and shape can be varied as desired.

As exemplified below, a plurality of embossments are formed on the optical polymer film. There are typically about 12 to about 150 embossments per lineal centimeter (30 to 400 per lineal inch). The embossments can be of any suitable depth, as long as the optical properties of the films are substantially retained after the embossments have been formed. The depth of an embossment can range from greater than zero to about 90 percent of the thickness of the optical polymer film depending on the type of film used.

While not wishing to be bound to any theory, it is believed that the bulk optical properties of the first class of optical films do not change substantially because the optical polymer film spends only a short time at elevated temperatures and the entire film is not heated above the melting temperature of the polymer. Time is an important consideration. Significant loss of desirable optical properties can occur when the films are heated at or above the softening temperature of the polymer for long periods of time. Such heat can cause loss of desired spatial relationships of the component materials as the orientation stresses relax or air is removed. Avoiding conditions sufficient to melt the polymer is also advantageous since molten polymer adheres to the embossing rolls and results in significant damage to the polymer film. In addition, the optical properties of some optical films are significantly altered if melting occurs because the polymer materials making up the optical polymer film have increased mobility and sufficient time to agglomerate or locally alter the thickness of the polymer components.

For the second class of optical films, those that do not lose their optical properties easily when exposed to excessive heat, the primary utility of the process of the invention lies in improved manufacture speed. The cubes are randomly realigned when a tooled embossing surface touches the cubes on the softened base layer. The cubes are either tilted on the softened base layer or are pushed into the layer. A sparkle appearance under irradiation occurs where the cubes were disordered. Independent control of the heating step and the embossing step can permit faster speeds.

When an optical polymer film is formed, the transmissive and reflective properties of the optical polymer film are determined by the type and spatial relationship of the different polymer components, including the thickness of the overall optical polymer film, the number and shape of the interfaces made by two adjacent materials, and the differences in relative refractive indices of the different materials that form the interfaces. Judicious variation of the types of materials forming the interfaces and the ordered spatial orientation and number of interfaces to be seen by a ray of a given wavelength determine whether the optical film is suitable for a given application such as a mirror, a color shift film, or a polarizer for a given range of wavelengths.

The reflective properties of optical films generally result from the ordered spatial orientation of the different polymer components making up the film. When an optical film is softened for a prolonged period of time or is melted, the spatial relationships tend to become adversely disordered. This often results in a substantial loss in the reflective properties if the disorder is substantial. However, it is not uncommon to observe substantial loss in only one of those properties depending on the type of optical film used.

The embossed optical film may be either surface treated or not during the process of the invention depending on the nature of the source of heat. When the source of heat is a flame, the method of this invention provides a means of both embossing and treating the surface of an optical polymer film. "Treating" means that both the wetting and adhesion characteristics of the polymer can be improved. This is because a flame is both a source of heat and of active chemical species, and so not only heats the polymer film but also oxidizes the surface of the film. When the source of heat is not a flame, e.g., a flameless radiant burner, active chemical species are not generated, thus no surface treatment occurs.

The process of this invention also provides various surface topographies. Changes to the topography can be useful in producing surfaces that have desirable frictional or adhesion properties.

Faster production speeds also can be enabled by the process of this invention. Because the heating step and the embossing step are separated, relatively higher heat flux sources may be used. Also, the short time between the onset of heating and the completion of cooling further increases options for heating and embossing without adversely affecting optical properties. Because the embossing tool is not also required to supply the heat to soften the film surface, long contact times against optical polymer film surfaces that have large heat capacities are not necessary and higher embossing speeds can be obtained.

The embossed optical polymer films of this invention may be used as stand-alone or self-supporting films or may be made into constructions with other layers. The embossed optical polymer films are useful as decorative films and are particularly suited to be formed into decorative articles such as ribbons, bows, wrapping film, gift bags, garland, streamers, centerpieces, ornaments and 3-dimentional shapes or as components of products including yarns, as an inset window in such articles as gift boxes and gift bags and as decorative packaging for such items as cosmetics or food. Embossed optical polymer films of the invention may also be used in applications requiring reduced specular gloss or lower surface friction or both, such as, for example, roll handling in manufacturing operations and overlay films on optical monitors. In addition, optical polymer films that have large heat capacities now can be embossed to form films having a glitter appearance similar to that described in U.S. Pat. No. 5,770,124 (Marecki et al) but at faster speeds.

EXAMPLES

This invention is further illustrated by the following examples that are not intended to limit the scope of the invention. In the examples, all parts, ratios and percentages are by weight unless otherwise indicated. All materials are commercially available, for example from Aldrich Chemicals, unless otherwise indicated or described.

Test Methods

Optical Gain Test

Optical Gain is the ratio of light transmitted through an LCD panel from a backlight with the film inserted between the panel and the backlight to the light transmitted without the film so inserted. A sample is cut, 21.6 cm (in the Transverse Direction) by 22.9 cm (in the Machine Direction), and placed on the backlight such that the embossed side is up, the machine direction is left to right and the left edge of the film is lined up with the left edge of the backlight. A plexiglass sheet is placed on top to hold the film in place and the assembly is placed behind an LCD panel. The light transmission through the LCD panel is measured with an LS-100 Luminance Meter available from Minolta Camera Company of Japan that is placed normal to the face of the LCD 3 minutes after the backlight is turned on. The measurement is repeated without the film between the backlight and the plexiglass holder. The gain is calculated as the transmission measurement made with the film divided by the transmission measurement made without the film.

Specular Gloss Determination

Specular Gloss is a measure of the light reflected from the film surface at the specular angle, that is, the angle equal and opposite to the angle of the incident light source. Gloss was measured according to the procedures described in ASTM 523-89, "Standard Test Method for Specular Gloss" using a gloss meter at both 20° and 60° measurement angles (commercially available under the trade designation "Haze-Gloss Reflectometer" from BYK-Gardner USA of Columbia, Md.). Because all of the samples were partially transparent, a matte, black surface was placed beneath each test specimen prior to the measurements. Five measurements were made for each film sample at each angle and in two different orientations. Machine-Direction (MD) orientation measurements were taken with the MD orientation of the sample aligned with the measurement axis of the instrument. Transverse-Direction (TD) measurements were taken with the TD orientation of the sample aligned with the measurement axis of the instrument. Averages of the five measurements were reported for each angle at each orientation.

Reflectance Spectra

Total Reflectance spectra were obtained according to the procedures described in ASTM E 1164-94 "Standard Practice for Obtaining Spectrophotometric Data for Object-Color Evaluation" for a wavelength range of 350 nanometers (nm) to 1050 nm, using a spectrophotometer (commercially available under the designation "Lambda 19 UV/VIS/NIR Spectrometer" from Perkin Elmer). Because of the partially transmitting nature of the samples, a matte-black backing surface was placed behind each test specimen prior to the reflectance measurements. Two reflectance spectra for each film sample were obtained at an angle normal to the film, one with the machine direction orientation of the sample aligned with the vertical axis of the instrument (MD_V), and a second with the machine direction orientation of the sample aligned with the horizontal axis of the instrument (MD_H).

Wetout Test

The Wetout Test is a method of grading the level of surface-to-surface wetting of films. When two smooth surfaces contact, they have a tendency to adhere tightly to each other due to surface contact. The visual effect of this type of surface wetting is the appearance of puddles similar to that seen when the surfaces have been contacted with water. A sample is placed on the clean glass surface of a light box and wiped down with moderate pressure using lint-free cotton gloves. After 15 seconds, the film is viewed from above at a distance of between 30 and 40 cm and subjectively graded according to the following table.

| | Wetout |
|---|---|
| Wetting Level | Description |
| 4 | Heavy wetting or puddling. |
| 3 | Moderate wetting. |
| 2 | Light wetting visible. |
| 1 | No wetting observed. |

Retroreflective Brightness Test

The coefficient of retroreflection, $R_A$, was measured in accordance with standardization test ASTM E 810-94. $R_A$ is a ratio of the coefficient of luminous intensity of a plane retroreflecting surface to its area and is expressed in candelas per lux per square meter $(cd/lx/m^2)$. The entrance angle used in ASTM E 810-94 was −4 degrees and the observation angle was 0.2 degrees. Further reference to "ASTM E 810-94" means ASTM E 810-94 where the entrance and observation angles are as specified in the previous sentence.

Examples 1–5 and Comparative Example C1

These examples illustrate the preparation of various embossed optical polymer films with reduced surface friction properties. The films were reflective polarizers which specularly reflect one plane of polarization and specularly transmit the other plane.

In Example 1, a combustible mixture was formed by mixing together an oxidizer comprised of dust-filtered compressed air (at 25° C., having a dew point of less than about −10° C.) with a natural gas fuel in a venturi mixer (Flowmixer Model 88-9 available from Pyronics Inc. of Cleveland, Ohio). The natural gas fuel had a specific gravity of 0.577; a stoichiometric ratio for dry air: natural gas of 9.6:1, and a heat content of 37.3 kJ/L. The flow rates of the air and natural gas were measured with flowmeters (Model 5812 (8–400 Lpm) and Model 5811 (1–50 Lpm)) (both commercially available from Brooks Instrument of Hatfield, Pa.). The mass flowmeters were calibrated using in-line cumulative-flow meters that operate on the displacement principle (commercially available from Rockwell International of Pittsburgh, Pa.). The natural gas and air flows were controlled with control valves (available from Badger Meter Inc. of Tulsa, Okla.). All flows were adjusted to result in a flame equivalence ratio of 1.00 and a normalized flame power of 600 W/cm². The combustible mixture passed through a pipe 3 meters long to a ribbon burner. The ribbon burner was a 30.5 cm×1 cm stainless steel ribbon mounted in a brass housing (available from Flynn Burner Corporation of New Rochelle, N.Y.).

The burner was mounted directly beneath a 25 cm-diameter, 40 cm-face-width steel chill roll (manufactured by F. R. Gross Company of Stow, Ohio). The chill roll had a 2 mm-thick covering of chlorosulfonated elastomer (No. FH-57771, having a Shore A Durometer of 80–90, available from the American Roller Company of Union Grove, Wis.). The backing roll was held at 38° C. by means of a water-recirculation system (commercially available under the trade designation "STERLCO" from Sterling Inc. of Milwaukee, Wis.). An electric spark ignited the combustible mixture. Stable conical flames were formed with tips 2–3 mm above the topmost surface of the ribbon burner. The input optical polymer film was a reflective polarizing film (0.13 mm average thickness, 31.8 cm wide), made as described in the Example of Patent Publication WO 98/04938. The film, moving at 80 meters/min, was guided by idler rolls to the backing roll. The distance between the uppermost surface of the ribbon burner and the backing roll was adjusted to maintain a distance of 6–8 mm between the tips of the luminous stable flame cones and the surface of the optical polymer film. The front side of the optical film was exposed to the laminar premixed flame while the back side was cooled by contact with the elastomer-covered backing roll.

After exposure to the flame, the optical polymer film was embossed by contact with a 10 cm-diameter, 40 cm-face-width embossing nip roll located at the 4 o'clock position on the output side of the backing roll. The zone where heating of the optical polymer film occurred was about 40% of the circumference of the backing roll. Using this value as the dimension of the heating zone, the exposure time of the optical polymer film to the heat of the flame was about 0.23 seconds. The dwell time, that is, the time of the combined steps of heating the film surface by the flame, embossing the film by contacting it with the embossing roll, and cooling the film surface below its softening temperature, was about 0.5 seconds.

The embossing nip roll consisted of a water-cooled steel core plated with a 0.9 mm thick coating of electroless copper that had a male-pattern cut into the copper. The pattern was cut into the central 30.5 cm of the nip roll, while the copper coating on the 7.6 cm of unpatterned nip-roll face on either side of the male pattern was reduced to a thickness of 0.5 mm. This caused the patterned portion of the embossing nip roll to be the only area of contact between the nip roll and the backing roll. The pattern was a truncated square pyramid with a base dimension of approximately 0.71 mm and a top dimension of approximately 0.20 mm, with 14 pyramids per centimeter of face width. The temperature of the embossing nip roll was held at 25° C. by a water-recirculation system ("STERLCO"). The embossing nip roll was forced against the film and backing roll by means of pressurized air cylinders that applied a total of about 16,000 Newtons against the backing roll. resulting in a force of about 530 Newtons-per-lineal-centimeter across the 30.5 cm face-width that contained the male embossing pattern.

The embossed optical polymer films of Examples 2–5 were made as Example 1 except the nip pressure against the patterned surface was increased to 570 Newtons-per-lineal-centimeter, 620 Newtons-per-lineal-centimeter, 700 Newtons-per-lineal-centimeter, and 1060 Newtons-per-lineal-centimeter, respectively.

Comparative Example C1 was the unembossed optical film of Example 1.

Examples 1–5 and Comparative Example 1 were measured for Optical Gain and Wet-Out. The results are shown in Table 1.

TABLE 1

| Example | Embossing Pressure (N/lineal cm) | Gain | Wet-Out |
|---|---|---|---|
| 1 | 530 | 1.561 | 4 |
| 2 | 570 | 1.559 | 3 |
| 3 | 620 | 1.550 | 2 |
| 4 | 700 | 1.548 | 1 |
| 5 | 1060 | 1.534 | 1 |
| C1 | n/a | 1.569 | 4 |

As seen in the table, the optical gain of the embossed film samples was minimally affected. The tendency of the film to wet-out onto a glass surface was substantially reduced in Examples 3, 4, and 5. This latter ability permits these films to be placed over a monitor screen without prematurely sticking to the surface of the screen. It also was observed that the distracting specular gloss or glare was reduced for all evaluated films.

Examples 6–7 and Comparative Example C2

This series of examples illustrates the preparation of an embossed optical polymer film using a different optical polymer film.

The films of Examples 6 and 7 were single layer reflective polarizing films made of a blend of 57.6 wt % of a co-PEN polymer; 40 wt % Questra™ MA405, available from Dow Chemical Company; and 2.4 wt % Dylark™332-80, available from Nova Chemical Company. The co-PEN polymer is based on 70 mole percent naphthalene dicarboxylate and 30 mole percent dimethylterephthalate and ethylene glycol. The formulation was extruded and then sequentially biaxially oriented. The web initially was drawn in the machine direction (MD) with a length-orienter (LO) and subsequently in the traverse direction (TD) with a tenter. The LO orientation was performed using a draw ratio of 1.3:1 (MD:TD). The temperature of the last roll prior to the draw was 120° C. and the power of the infrared lamps over the stretch zones was 80%. The TD draw ratio was approximately 1:5.9 (MD:TD) based on rail settings at the entrance and exit of the tenter. The draw temperature was 118° C. The heat set temperature was 163° C. The thickness of the film was approximately 106 μm.

The films of Examples 6 and 7 were embossed and tested as Examples 3 and 5, respectively, except the film speed and resulting dwell time were changed and the embossing pressure were as recorded in Table 2. For both examples, the speed was increased to 100 m/min from 80 m/min resulting in a dwell time decrease to about 0.4 seconds from about 0.5 seconds.

Comparative Example C2 was the unembossed optical film of Example 6.

Examples 6 and 7 and Comparative Example C2 were measured for Normal Incidence Gain. The results are shown in Table 2.

TABLE 2

| Example | Embossing Pressure (N/lineal cm) | Gain |
|---|---|---|
| 6 | 620 | 1.356[a] |
|   |     | 1.370[b] |
| 7 | 1060 | 1.373[a] |
|   |      | 1.366[b] |
| C2 | n/a | 1.367 |

[a]Embossed surface of film faced away from light source during test.
[b]Embossed surface of film faced towards light source during test.

As seen in Table 2, the desired optical properties of selective reflection and transmission of polarized light, as measured by optical gain, were minimally affected, even at high embossing pressure conditions.

Examples 8–12 and Comparative Examples C3–C4

These examples illustrate the preparation of an embossed optical polymer film using a different optical polymer film. The embossed films were made in a manner similar to Example 1, except the optical polymer films were various color shift films, and some of the process conditions were altered. Two input optical films were used, prepared as described below:

Optical Film A

Optical Film A was an optical polymer film having an average thickness of 54 μm and a width of 20.3 cm. The film was prepared as follows. A coextruded film containing 224 layers was made on a sequential flat-film making line by a coextrusion process. This multilayer polymer film was made from copolyethylene naphthalate (LMPP) comprised of 90 mol % naphthalate and 10 mol % terephathalate as the dicarboxylates and 100% ethylene glycol as the diol with an intrinsic viscosity of 0.48 dl/g and polymethyl methacrylate (PMMA) available from ICI Acrylics under the designation CP71, where LMPP provided the outer or "skin" layers. A feedblock method (such as that described by U.S. Pat. No. 3,801,429) was used to generate about 224 layers which were coextruded onto a water chilled casting wheel and continuously oriented by conventional sequential length orienter (LO) and tenter equipment. LMPP was delivered to the feedblock by one extruder at a rate of 46.0 Kg/hr and the PMMA was delivered by another extruder at a rate of 35.9 Kg/hr. These meltstreams were directed to the feedblock to create the LMPP and PMMA optical layers. The feedblock created 224 alternating layers of LMPP and PMMA with the two outside layers of LMPP serving as the protective boundary layers (PBLs) through the feedblock. The PMMA melt process equipment was maintained at about 265° C.; the PEN melt process equipment, feedblock, skin-layer modules were maintained at about 265° C.; and the die was maintained at about 285° C. A gradient in layer thickness was designed for the feedblock for each material with the ratio of thickest to thinnest layers being about 1.25. An axial rod, as described in filed patent application U.S. Ser. No. 09/006288, was used to narrow the bandwidth.

After the feedblock, a third extruder delivered 0.48 IV LMPP as skin layers (same thickness on both sides of the optical layer stream) at about 93.2 Kg/hr. Then the material stream passed through a film die and onto a water cooled casting wheel using an inlet water temperature of about 18° C. A high voltage pinning system was used to pin the extrudate to the casting wheel at 6.6 meters/min. The pinning wire was about 0.17 mm thick and a voltage of about 5.6 kV was applied. The pinning wire was positioned manually by an operator about 3–5 mm from the web at the point of contact to the casting wheel to obtain a smooth appearance to the cast web.

The cast web was length oriented with a draw ratio of about 3.3:1 at about 120° C. In the tenter, the film was preheated before drawing to about 125° C. in about 14 seconds and then drawn in the transverse direction at about 125° C. to a draw ratio of about 4.3:1, at a rate of about 20% per second.

Optical Film B

Optical Film B was an optical polymer film having an average thickness of 37 μm and a width of 20.3 cm. A multilayer film containing about 418 layers was made on a sequential flat-film making line via a coextrusion process. This multilayer polymer film was made from polyethylene terephthalate and ECDEL 9967. ECDEL 9967, believed to be a copolyester based on 1,4-cyclohexane dicarboxylic acid, 1,4-cyclohexane dimethanol, and polytetramethylene ether glycol, is commercially available from Eastman Chemicals Co., Rochester, N.Y. A feedblock method (such as that described by U.S. Pat. No. 3,801,429) was used to generate about 209 layers with an approximately linear layer thickness gradient from layer to layer through the extrudate.

The PET, with an Intrinsic Viscosity (IV) of 0.6 dl/g was delivered to the feedblock by an extruder at a rate of about 34.5 kg/hr and the ECDEL at about 32.8 kg/hr. After the feedblock, the same PET extruder delivered PET as protective boundary layers (PBLs), to both sides of the extrudate at about 7.1 kg/hr total flow. The material stream then passed though an asymmetric two times multiplier (U.S. Pat. Nos. 5,094,788 and 5,094,793) with a multiplier design ratio of about 1.40. The multiplier ratio is defined as the average layer thickness of layers produced in the major conduit divided by the average layer thickness of layers in the minor conduit. This multiplier ratio was chosen so as to leave a spectral gap between the two reflectance bands created by the two sets of 209 layers. Each set of 209 layers has the approximate layer thickness profile created by the feedblock, with overall thickness scale factors determined by the multiplier and film extrusion rates.

The ECDEL melt process equipment was maintained at about 265° C., the PET (optical layers) melt process equipment was maintained at about 265° C., and the feedblock, multiplier, skin-layer meltstream, and die were maintained at about 274° C.

The feedblock used to make the film for this example was designed to give a linear layer thickness distribution with a 1.3:1 ratio of thickest to thinnest layers under isothermal conditions. To achieve a smaller ratio for this example, a thermal profile was applied to the feedblock. The portion of the feedblock making the thinnest layers was heated to 285° C., while the portion making the thickest layers was heated to 265° C. In this manner the thinnest layers are made thicker than with isothermal feedblock operation, and the thickest layers are made thinner than under isothermal operation. Portions intermediate were set to follow a linear temperature profile between these two extremes. The overall effect is a narrower layer thickness distribution which results in a narrower reflectance spectrum. Some layer thickness errors are introduced by the multipliers, and account for the minor differences in the spectral features of each reflectance band. The casting wheel speed was adjusted for precise control of final film thickness, and therefore, final color.

After the multiplier, thick PET skin layers were added at about 28.8 kg/hour (total) that was fed from a third extruder. Then the material stream passed through a film die and onto a water cooled casting wheel. The inlet water temperature on the casting wheel was about 5° C. A high voltage pinning system was used to pin the extrudate to the casting wheel. The pinning wire was about 0.17 mm thick and a voltage of about 6.5 kV was applied. The pinning wire was positioned manually by an operator about 3 to 5 mm from the web at the point of contact to the casting wheel to obtain a smooth appearance to the cast web. The cast web was continuously oriented by conventional sequential length orienter (LO) and tenter equipment. The web was length oriented to a draw ratio of about 3.5 at about 100° C. The film was preheated to about 110° C. in about 12 seconds in the tenter and drawn in the transverse direction to a draw ratio of about 3.5 at a rate of about 15 per second.

For Example 8, Film A was embossed using a normalized flame power of 580 W/Cm$^2$, a line speed of 100 m/min, and an embossing pressure of 1060 N/lineal cm. The embossing tool had 69 truncated square pyramids per lineal cm of face width.

Example 9 was made as Example 8 except the normalized flame power was 864 W/Cm$^2$. Example 10 was made in as in Example 8 except the normalized flame power was 720 W/Cm$^2$, the line speed was 125 m/min and the embossing tool had 14 truncated square pyramids per lineal cm of face width.

For Example 11 Film B was embossed as in Example 8 except the line speed was 150 m/min. Example 12 was made as in Example 11 except the line speed was 125 m/min.

Comparative Examples C3 and C4 were the unembossed optical polymer films of Examples 8 and 11 respectively.

Examples 8–12 and Comparative Examples C3–C4 were measured for Specular Gloss at 60 Degrees and 20 Degrees in both the MD and TD orientation, and Reflectance Spectra were prepared. The results are shown in Table 3 and by FIGS. 3–8.

TABLE 3

| Example | 60 degree Gloss | | 20 Degree Gloss | |
| --- | --- | --- | --- | --- |
|  | MD | TD | MD | TD |
| 8 | 200 | 176 | 16 | 15 |
| 9 | 50 | 52 | 5 | 5 |
| 10 | 50 | 48 | 6 | 5 |
| C3 | 786 | 779 | 131 | 119 |
| 11 | 22 | 26 | 3 | 3 |
| 12 | 23 | 22 | 1 | 2 |
| C4 | 195 | 189 | 65 | 62 |

Figure 3:
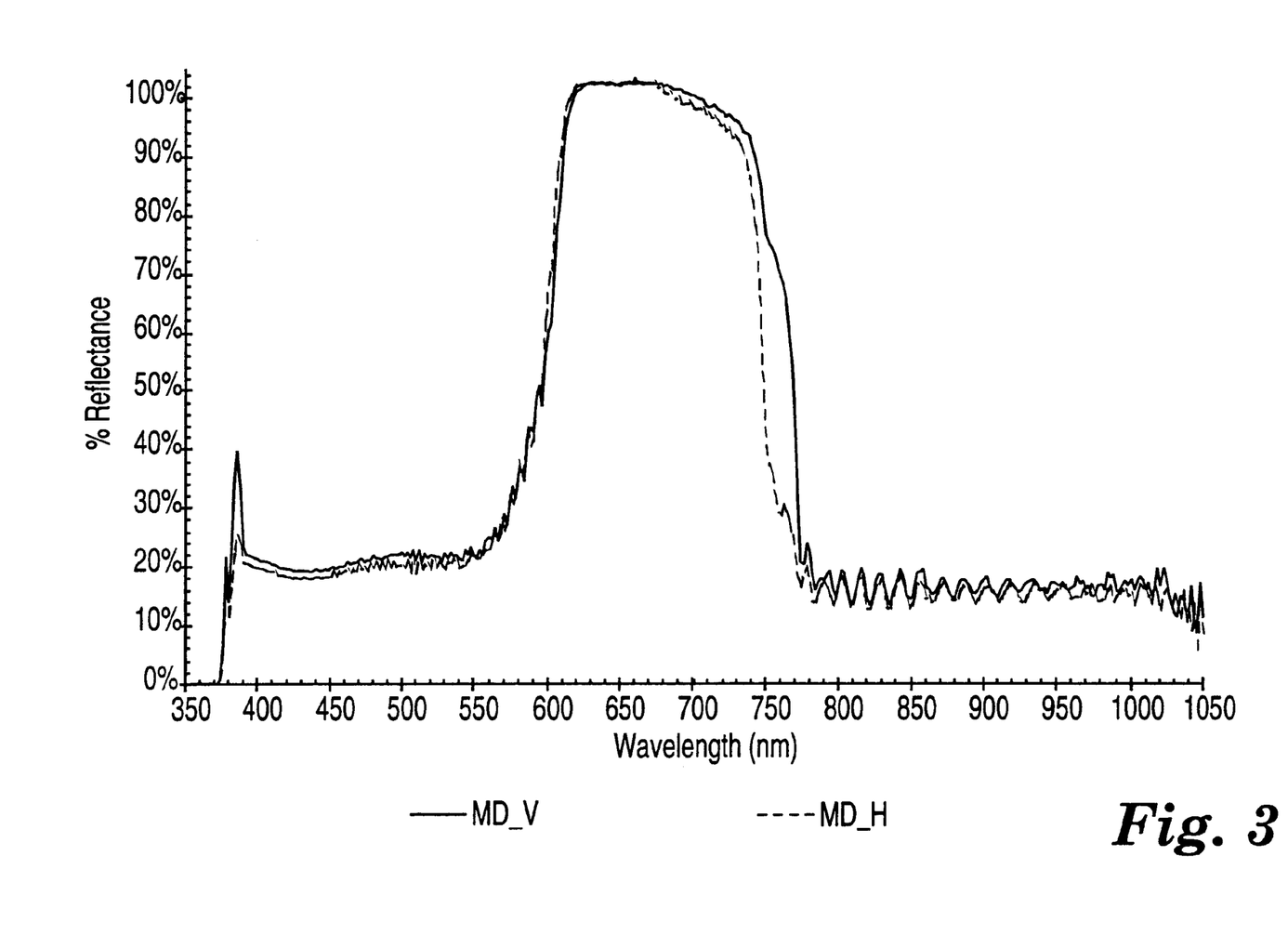
FIG. 3 is a graph depicting the reflectance spectra over a band width of 350 nanometers (nm) to 1050 nm for Example 8.
Figure 4:
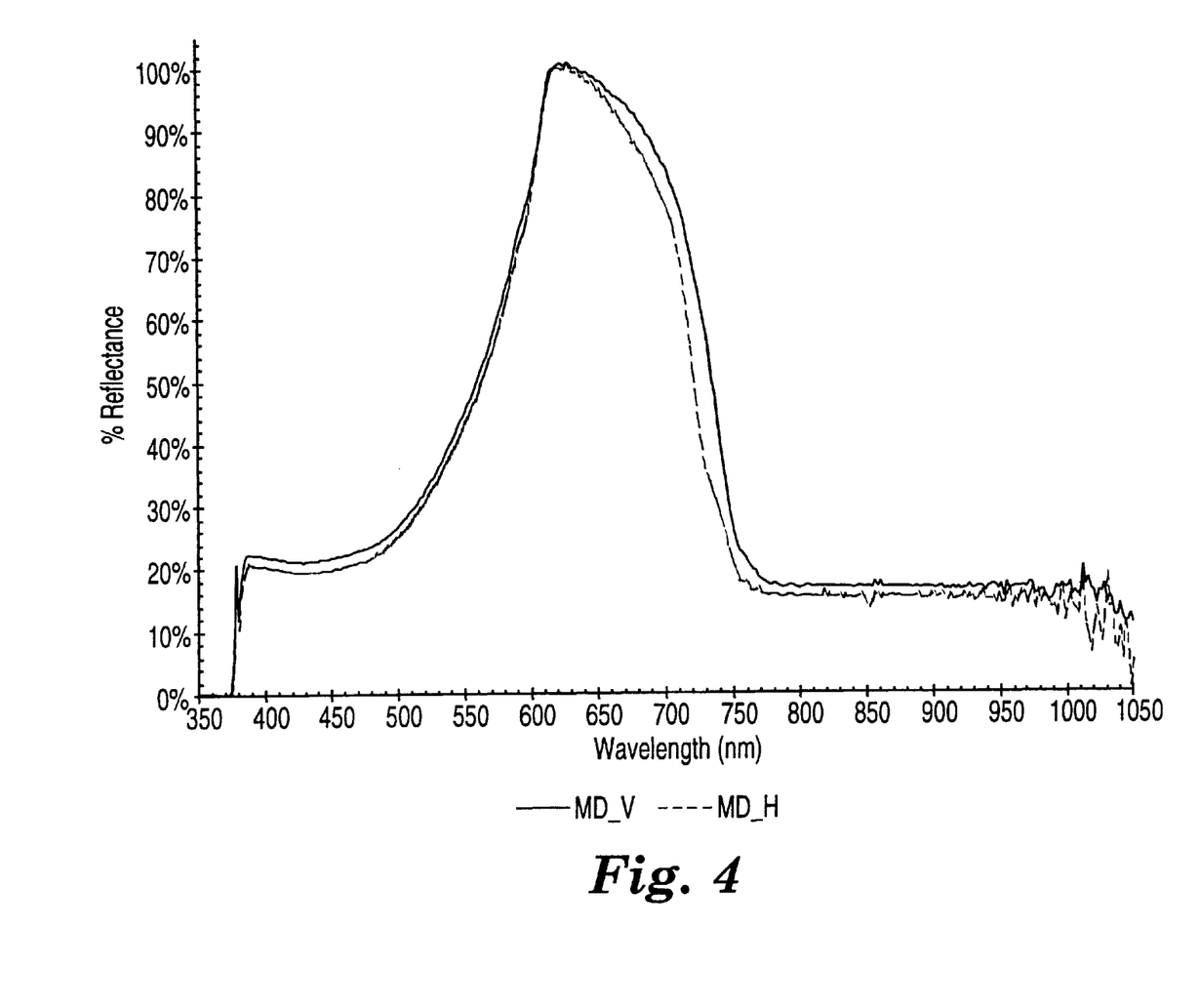
FIG. 4 is a graph depicting the reflectance spectra over a band width of 350 nanometers (nm) to 1050 nm for Example 10.
Figure 5:
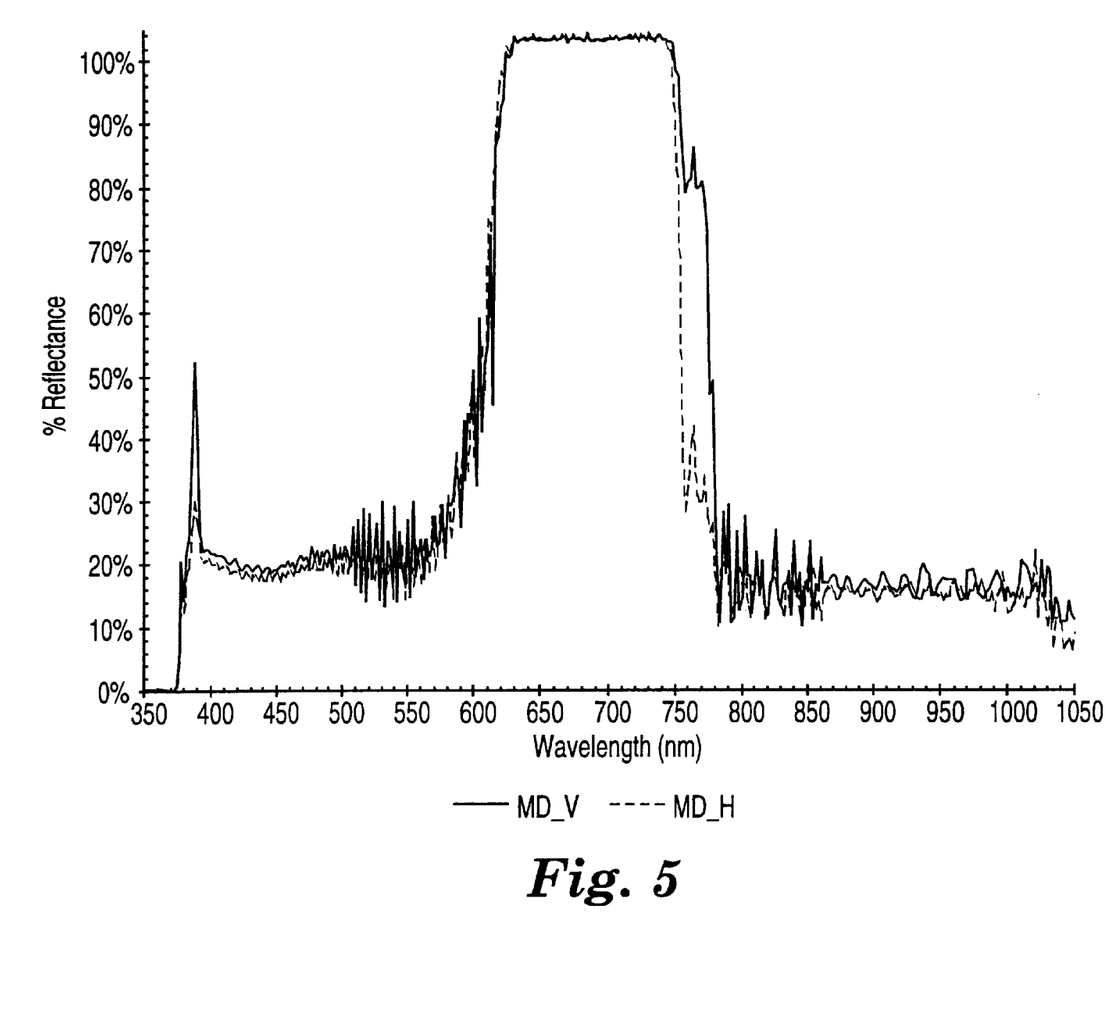
FIG. 5 is a graph depicting the reflectance spectra over a band width of 350 nanometers (nm) to 1050 nm for Comparative Example C3.
Figure 6:
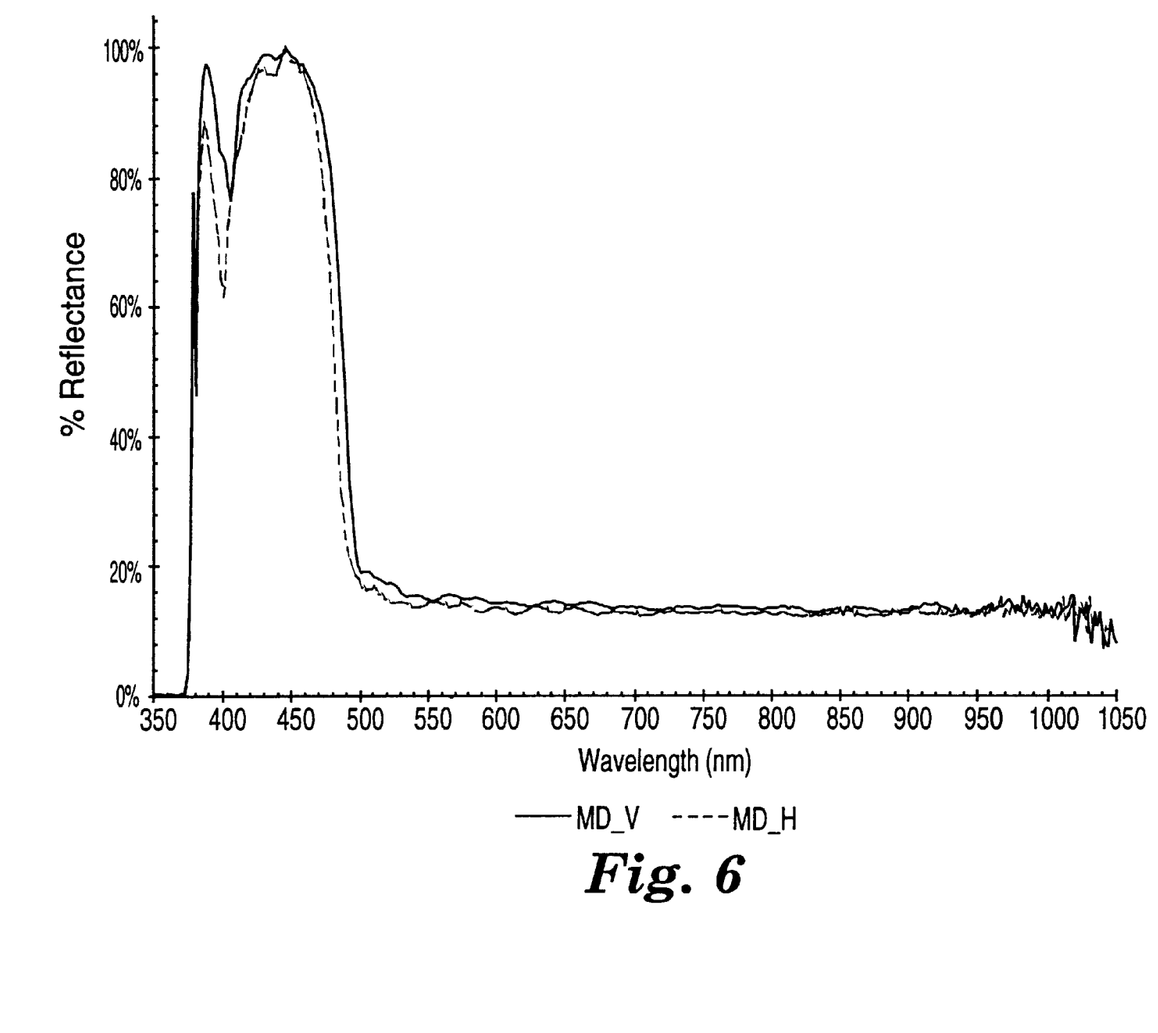
FIG. 6 is a graph depicting the reflectance spectra over a band width of 350 nanometers (nm) to 1050 nm for Example 11.
Figure 7:
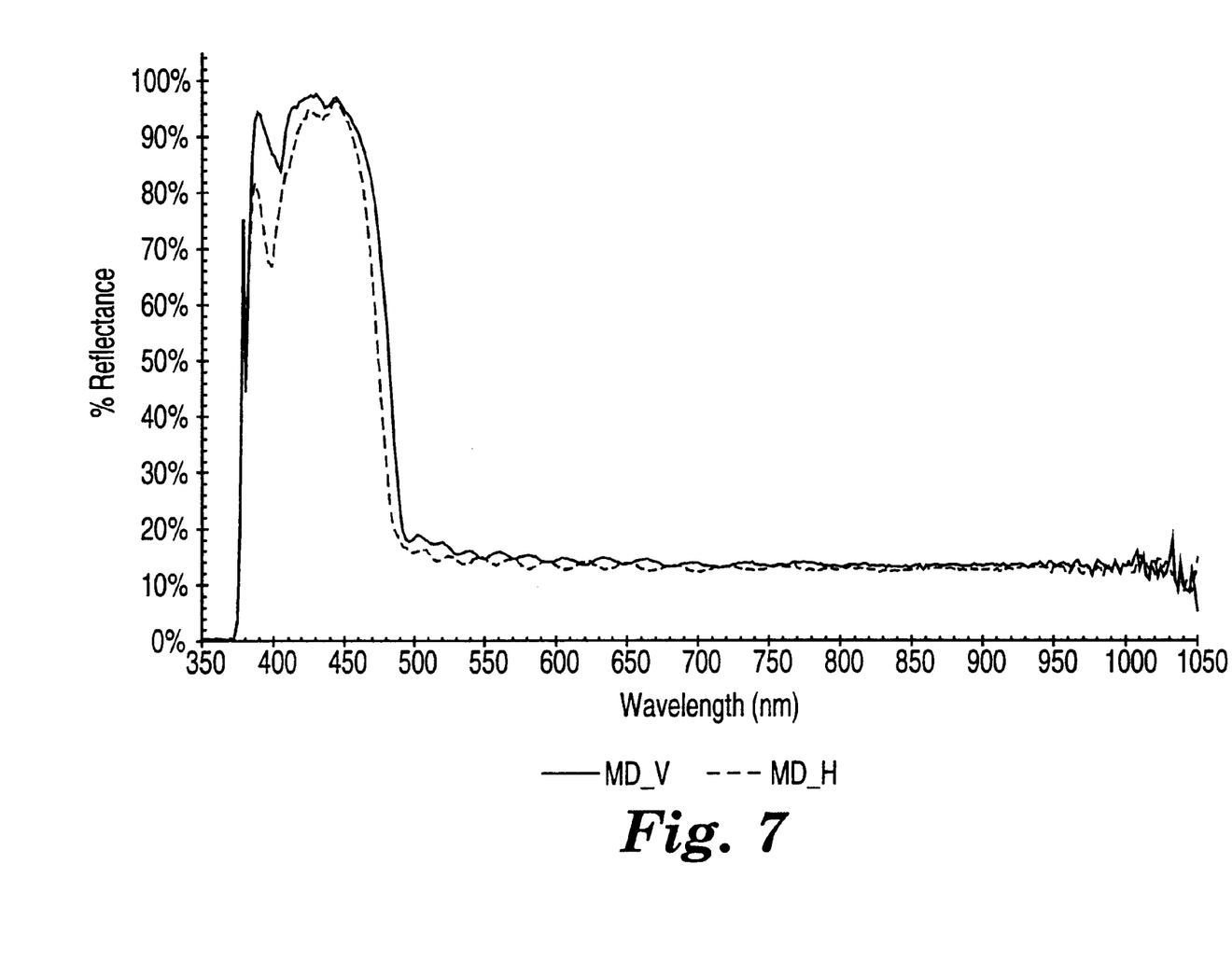
FIG. 7 is a graph depicting the reflectance spectra over a band width of 350 nanometers (nm) to 1050 nm for Example 12.
Figure 8:
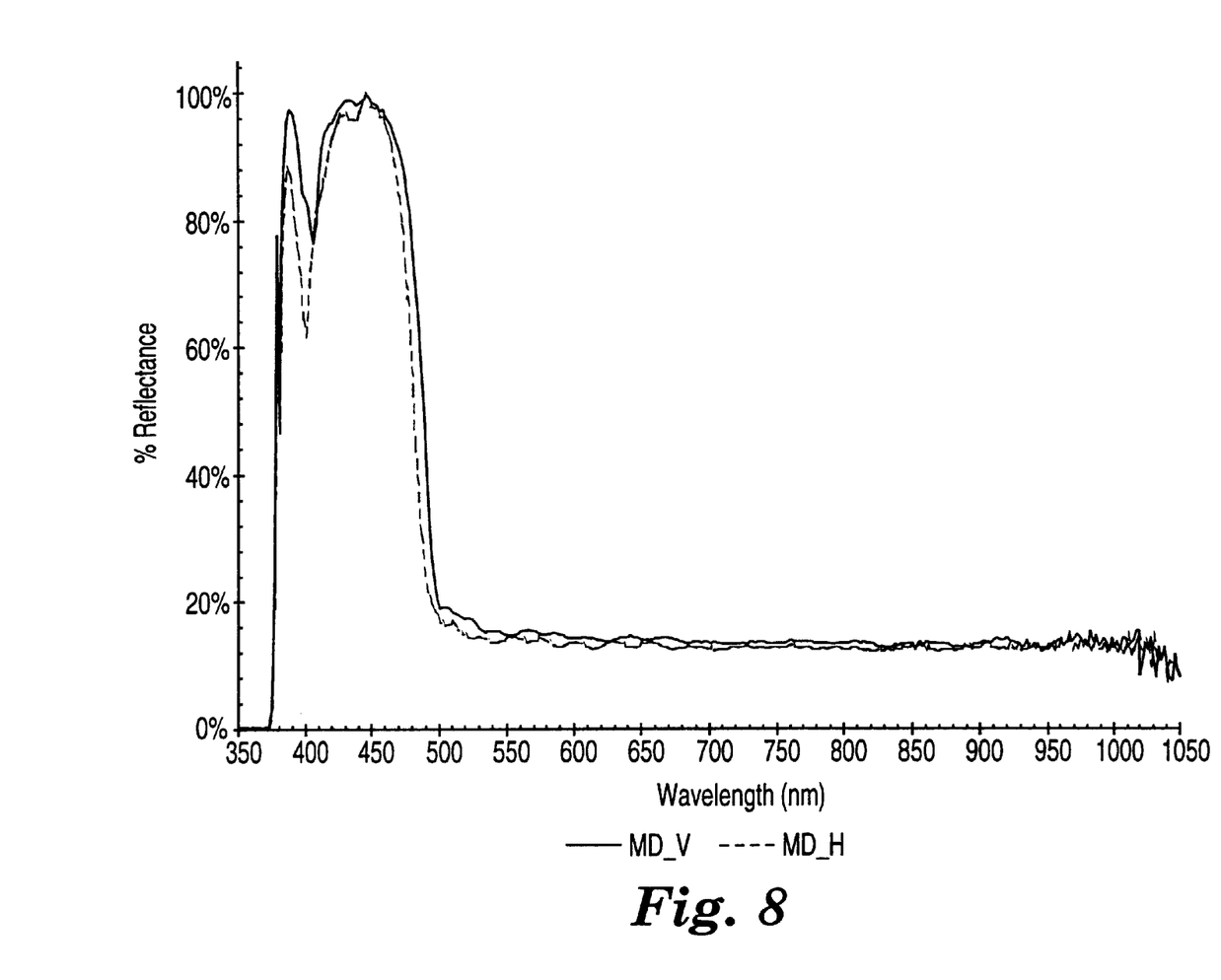
FIG. 8 is a graph depicting the reflectance spectra over a band width of 350 nanometers (nm) to 1050 nm for Comparative Example C4.

As seen in the Table 3, the specular gloss was significantly reduced through embossing by the process of the invention. In addition, there is a minimal effect by the process of the invention on the optical property of reflectance as shown by a shift in bandwidth of less than 50 nanometers when the reflectance spectra for Examples 8 and 10, depicted in FIGS. 3 and 4, are compared with those for Comparative Example C3, depicted in FIG. 5. Similar minimal effect on the optical property of transmission was observed by comparing the transmission spectra for Examples 11 and 12 with that for Comparative Example C4 as depicted in FIGS. 6–8, respectively.

Decorative bows were made with the embossed optical film of Example 8 and the unembossed optical film of Comparative Example C3. Samples of each were slit with a conventional razor blade slitter into rolls having a width of 1.27 cm. Each roll was made into a confetti bow having 31 loops and an overall diameter of almost 13 cm. By using an electronic bow machine available from Cambarloc Engineering, Inc. located in Missouri.

The finished bow from the embossed film, Bow A, appeared generally more subtle than the unembossed version, Bow B. A reduced level of specular gloss was observed in the inner cavities of Bow A. This accentuated the subtle, less metallic appearance of Bow A, while the overall brightness and color qualities of both were similar.

Examples 13 and 14 and Comparative Examples C5 & C6

These examples illustrate the preparation of an embossed optical polymer film using a different optical polymer film.

The embossed films of Examples 13 and 14 were made in a manner similar to Example 5, except the optical polymer films were both retroreflective cube-corner films on liners with different film thickness and width dimensions and the process conditions were different. In Example 13, the film, available as 3M Scotchlite™ Reflective Material–6260 White High Gloss Film from 3M Co., had an average thickness of 380 μm and a width of 15.2 cm. The flame was controlled to have a normalized flame power of 1150 W/cm$^2$, The film speed was 45 m/min resulting in a dwell time of about 0.9 seconds, the temperature of the backup roll was 93° C. and the film was run with the cube-corner against the tooled surface.

Example 14 was made as in Example 13 except the film had an average thickness of 230 μm and a backup roll temperature of 66° C.

Comparative Example C5 was made from the same optical polymer film as used in Example 13 using the continuous method described in U.S. Pat. No. 5,770,124 column 12, lines 38–58. The film was passed through a nip formed by a textured silicone rubber roll and a smooth steel roll. The steel roll was maintained at a temperature of 191° C. and the carrier side of the film was against the steel roll. The cube-corner side of the film contacted the rubber-covered roll and the speed of the optical film was 1.8 meters per minute.

Comparative Example C6 was the unembossed optical film of Example 13.

Examples 13 and 14 and Comparative Example C5 and C6 were measured for the coefficient of retroreflection at both 0 degrees and 90 degree orientations. The results are shown in Table 4.

TABLE 4

| Example | Film Thickness (μm) | R$_A$ at 0 degrees (cd/lx/m$^2$) | R$_A$ at 90 degrees (cd/lx/m$^2$) |
| --- | --- | --- | --- |
| 13 | 380 | 87 | 78 |
| 14 | 230 | 16 | 13 |
| C5 | 380 | 176 | 158 |
| C6 | 380 | 825 | 656 |

The desired optical property is a glittering effect that is observed visually. All of the films in the above table had satisfactory retroreflectivity and all except Comparative Example C6 (unembossed film) exhibited similar degrees of glitter when seen in the transmission mode. The same was observed when viewed in the reflective mode.

Various modifications and alterations of this invention will be apparent to those skilled in the art without departing from the scope and spirit of this invention, and it should be understood that this invention is not limited to the illustrative embodiments set forth herein.

We claim:

1. A method of making an embossed optical polymer film comprising:

providing an optical polymer film having first and second major surfaces;

softening at least one of the first and second major surfaces to produce a softened surface by exposing it to a burner selected from a flame burner and a flameless radiant burner;

embossing the softened surface to produce an embossed optical polymer film; and cooling the embossed optical polymer film, the process conditions of the flame power of the burner and the dwell time, during which the film is softened, embossed and cooled, being effective to yield a film for which the reflectance of a range of wavelengths is substantially the same before and after embossing.

2. The method of claim 1 in which the dwell time for the combined steps of softening, embossing, and cooling is from about 0.05 to about one second.

3. The method of claim 2 in which the flame power is in the range of about 580 W/cm$^2$ to 1150 W/cm$^2$.

4. The method of claim 1 wherein the softening step is carried out by using a flameless radiant burner.

5. The method of claim 1 wherein the optical polymer film is selected from the group consisting of color shift films, specularly transmissive and specularly reflective films, specularly transmissive and diffusely reflective films, retroreflective cube-corner films and diffusely reflective.

6. The method of claim 1 wherein the optical polymer film has strain-induced birefringence.

7. A method of making an optical polymer article comprising:

providing a layered construction comprising a multilayered optical polymer film having a major surface;

softening the major surface to produce a softened surface by exposing it to a burner selected from a flame burner and a flameless radiant burner;

embossing the softened surface to produce an embossed layered construction; and cooling the embossed layered construction, the process conditions of the flame power of the burner and the dwell time, during which the film is softened, embossed, and cooled, being effective to yield a film for which the reflectance of a range of wavelengths is substantially the same before and after embossing.

8. The method of claim 7 wherein the dwell time for the combined steps of softening, embossing, and cooling is less than about one second.

9. The method of claim 7 in which the multilayered optical polymer film comprises a multiplicity of layers each having a thickness less than a wavelength of light.

10. The method of claim 7 wherein the softening step is carried out by a flame burner.

11. The method of claim 7 wherein the softening step is carried out by a flameless radiant burner.

12. The method of claim 7 wherein the optical polymer film is selected from the group consisting of color shift films, specularly transmissive and specularly reflective films, specularly transmissive and diffusely reflective films, retroreflective cube-corner and diffusely reflective.

13. The method of claim 7 wherein the optical polymer film has strain-induced birefringence.

14. A method of making an embossed optical polymer film comprising:

providing an optical polymer film having first and second major surfaces;

softening at least one of the first and second major surfaces to produce a softened surface by exposing it to a burner selected from a flame burner and a flameless radiant burner;

embossing the softened surface to produce an embossed optical polymer film; and cooling the embossed optical polymer film, the process conditions of the flame power of the burner and the dwell time, during which the film is softened, embossed and cooled, being effective to yield a film for which the transmission of a range of wavelengths is substantially the same before and after embossing.

* * * * *